Patented Nov. 20, 1951

2,575,912

UNITED STATES PATENT OFFICE 2,575,912

SILICONE RESIN SOLUTIONS

Charles D. Doyle, Schenectady, N. Y., assignor to General Electric Company, a corporation of New York No Drawing. Application March 22, 1951, Serial No. 217,053

9 Claims. (Cl. 260—32.6)

This invention is concerned with resinous compositions comprising a gelled organopolysiloxane resin dissolved in a trialkyl amine. The invention also covers methods for reclaiming organopolysiloxane resins which have gelled either through standing long periods of time or by the application of heat or by other means used to effect gelling of silicone resins.

One of the difficulties in handling organopolysiloxane resins or silicone resins as they are known is the fact that upon standing for any length of time they very often tend to increase in viscosity and eventually turn into a gel whereby the product becomes substantially infusible and insoluble in most solvents. Up to the present time the attainment of such a state has necessitated discarding the gelled material. Many suggestions have been proposed for obviating this difficulty as, for instance, by incorporating inhibitors in the silicone resin. Although in many respects these inhibitors may retard the gelation, they also tend to introduce an impurity into the resin which may affect the heat stability or other properties associated with silicone resins. Because of this difficulty it has become necessary to use silicone resins quite soon after they are prepared. If gelling of the resin should take place, these resins have usually been discarded.

Unexpectedly, I have now discovered that gelled silicone resins may be reclaimed and caused to dissolve in certain media to give useful solutions which can be used to again deposit films of the resin to obtain in some cases films which heat-age better and have greater strength than films deposited from the same ungelled resin. In accordance with my invention I dissolve the gelled silicone resin (which is usually insoluble and infusible) in a composition comprising a trialkylamine corresponding to the general formula:

$$\begin{array}{c} \text{R} \\ | \\ \text{N—R} \\ | \\ \text{R} \end{array}$$

where R is the same or different alkyl groups containing from 2 to 3, inclusive carbon atoms as, for instance, ethyl, propyl, and isopropyl groups. The amount of gelled resin which may be dissolved may, of course, vary within fairly wide limits. I have found that I am able to dissolve as much as from about 1% to as high as 30% or 40% of the gelled silicone resin in the trialkylamine without detrimental effect. Generally, I prefer to prepare a solution of the gelled resin in the trialkylamine in a concentration equal to from about 20 to 35% resin, based on the total weight of the resin and the trialkylamine. The manner in which solution of the gelled resin may be accomplished may also be varied as, for instance, one may employ room temperature conditions whereby the gelled resin and the trialkylamine are mixed together and allowed to stand at room temperature. On the other hand, application of heat to the mixture will hasten the solution of the gelled resin in the trialkylamine. Temperatures on the order of about 50° to 75° C. for varying lengths of time may, of course, be used without departing from the scope of the invention.

I have found that my process is generally applicable to most gelled silicone resins. These resins may include various alkyl, aryl, alkaryl, aralkyl, mixed alkyl and aryl organopolysiloxanes, as well as organopolysiloxanes containing substituents on the organic radicals, etc. Many examples of such resins are found in Rochow patents 2,258,218–222, issued October 7, 1941, and in Welsh patent 2,449,572, issued September 21, 1948 and assigned to the same assignee as the present invention.

In choosing the particular resin which is to be dissolved in the trialkylamine, it is advantageous to use organopolysiloxane resins which are preferably free of carbon-carbon bonds. In addition, too high a concentration of mono-alkyl siloxy units, for example, monomethyl siloxy units, will cause a decrease in the solubility of the gelled resin in the trialkylamine. The presence of aryl or aromatic groups, for example, phenyl groups in the organopolysiloxane resin facilitates solubilization of the organopolysiloxane resin. In general, it is desirable that the alkyl siloxy concentration be below 80 mol. percent of the total molar content of the organic groups in the organopolysiloxane resin. It will, of course be understood that in addition to alkyl and aryl groups, as pointed out above, especially in the aforesaid Welsh patent, other organic groups may be attached to silicon by carbon-silicon linkages, as for example, allyl, vinyl radicals, etc.

In order that those skilled in the art may better understand how the present invention may be practiced, the following examples are given by way of illustration and not by way of limitation. All parts are by weight.

EXAMPLE 1

An organopolysiloxane resin was prepared by effecting hydrolysis of a mixture of ingredients comprising allyltrichlorosilane, methyltrichlorosilane, phenyltrichlorosilane, and dimethyldichlorosilane, wherein the materials were in the molar ratio of 1 to 7 to 1 to 1. This mixture was hydrolyzed by pouring into water in the manner well known in the art and the resin thereby obtained was dissolved in a mixture of toluene and butanol. A gel of this resin was prepared by heating the resin and evaporating the resin to dryness at about 60° C. The resin thus obtained was completely insoluble in toluene or butanol after this volatilization of the solvent. Thereafter the gelled resin was added to different types of organic amines in a concentration corresponding to about .1 part of the organopolysiloxane gel to 1.0 part of the amine. In each case the mixture was allowed to stand at room temperature and wherever an adequate solution was obtained, the resin was deposited in the form of a film to determine its properties. The following Table I shows the effect of mixing this gelled organopolysiloxane resin with various amines.

Table I

| Solvent | Appearance after 2 days |
|---|---|
| Control (toluene-butanol) | Swelled. |
| Diethylamine | Partial solution. |
| Triethylamine | Solution (1 day). |
| Tributylamine | Swelled. |
| Benzyltrimethyl Ammonium Butoxide | Solution (1 day). |
| Triethanolamine | Wet gel. |
| Ethylene diamine | Partial solution. |

From the foregoing table it is clearly apparent that the greatest solution in the shortest period of time of the gelled resin was in combination with the triethylamine.

EXAMPLE 2

In this example the same gelled resin that was employed in Example 1 was mixed with triethylamine to form a mixture in which the gelled resin comprised about 30% of the total weight of the resin and the triethylamine. Another sample was prepared in which the same amounts of corresponding ingredients were used with the exception that instead of triethylamine, benzyl trimethyl ammonium butoxide was used in place of the triethylamine. After standing for about one day each of the samples had become a homogeneous solution. Thereafter films were deposited from each of the two solutions by evaporating or heating the deposit of films for three hours at 100° C. after the respective samples had been placed on an aluminum surface. At the end of this period the triethylamine solution had deposited a light colored continuous film which was dry and horny. In contrast to this the film deposited from the benzyltrimethyl ammonium butoxide was dark and tacky and smelled strongly of an amine. When each of the films was heated for one hour at 200° C., the film made with the benzyltrimethyl ammonium butoxide charred and cracked whereas the film made from the triethylamine was still light colored and continuous. Heat-aging at 200° C. of this latter film for 500 hours still gave a light colored film. The craze life of the latter film was 100 hours as compared to 6 hours for a film deposited from a solution of the ungelled organopolysiloxane resin. The results above should be contrasted with films deposited from the ungelled organopolysiloxane resin prepared above in which the film was placed on an aluminum surface and heated for 3 hours at 100° C. to evaporate the solvent. In the latter instance the films would be brittle and thermoplastic.

EXAMPLE 3

In this example a methylphenyl polysiloxane resin obtained by cohydrolyzing a mixture of ingredients comprising methyltrichlorosilane and phenyltrichlorosilane and dissolving the resinous product in toluene, was caused to gel by heating the toluene solution until most of the solvent had been evaporated. The gelled resin was insoluble in toluene at the end of this heating period but could be readily dissolved in triethylamine.

It will of course be apparent to those skilled in the art that instead of the alkyl amines employed above in the practice of the present invention, other amines corresponding to the general formula

where R is the same or different alkyl groups as stated above, may also be used without departing from the scope of the invention. In addition, other organopolysiloxane resins may be employed, many examples of which have been given previously in the aforementioned patents. Generally I prefer to use an organopolysiloxane resin containing an average of from about 1.2 to about 1.7 organic groups per silicon atom preferably one containing both methyl and phenyl groups in which the molar concentration of the monomethyl siloxy units is below 80%. Generally, less difficulty is experienced in effecting solution of the gelled resins in the trialkylamines if the gelled state has not been attained due to the presence of a cure accelerator or curing catalyst as, for instance, zinc octoate, lead naphthenate, etc. Gelled resins resulting from the use of curing catalyst can be dissolved in the trialkylamine, for instance, the triethylamine with somewhat greater difficulty. I have also found that the presence of polymer bonds other than the Si-O-Si linkage also affects the ease with which solution in the trialkylamine is effected.

My invention has particular utility in reclaiming and recovering gelled silicone resins which have been inadvertently permitted to get in storage or due to certain environmental conditions as, for example heat, presence of curing catalyst, etc. By converting gelled batches of silicone resins usable solutions, it is apparent that a material saving in money can be realized as a result of my discovery. The trialkylamine can be used to remove cured silicone resins from coated surfaces to give essentially resin-free surfaces. Even surfaces coated with silicone resins which had been baked at 200° C. for 1100 hours could readily be cleaned of the silicone resin by treatment with the trialkylamine.

What I claim as new and desire to secure by Letters Patent of the United States is:

1. A composition of matter comprising (1) a gelled hydrocarbon-substituted polysiloxane resin in which the hydrocarbon groups thereof are attached to silicon atoms by carbon-silicon linkages, and (2) a solvent for (1) comprising a trialkylamine containing from 2 to 3 carbon atoms, inclusive, in the alkyl groups.

2. A composition of matter comprising (1) a gelled methyl and phenyl polysiloxane resin in which the methyl and phenyl groups are attached to the silicon atoms of the polysiloxane by carbon-silicon linkages, and (2) a solvent for (1) comprising a trialkylamine containing from 2 to 3 carbon atoms, inclusive, in the alkyl groups.

3. A composition of matter comprising (1) a gelled hydrocarbon-substituted polysiloxane resin containing allyl, methyl and phenyl groups attached to silicon atoms by carbon-silicon linkages, and (2) a solvent for (1) comprising a trialkylamine containing from 2 to 3 carbon atoms, inclusive, in the alkyl groups.

4. A composition of matter comprising (1) a gelled methyl phenyl polysiloxane resin in which the methyl and phenyl groups are attached to silicon atoms by carbon-silicon linkages, there being present from about 1.2 to 1.8 total methyl and phenyl groups per silicon atom, and (2) a solvent for (1) comprising triethyl amine.

5. A composition of matter comprising (1) a gelled hydrocarbon-substituted polysiloxane resin containing an average of from 1.2 to 1.8 total hydrocarbon groups per silicon atom, the said polysiloxane resin consisting solely of methyl groups, allyl groups and phenyl groups attached to silicon atoms by carbon-silicon linkages, and (2) a solvent for the aforesaid gelled organopolysiloxane resin comprising triethyl amine.

6. A composition of matter comprising (1) a gelled hydrocarbon-substituted polysiloxane resin containing an average of from about 1.2 to 1.8 total hydrocarbon groups per silicon atom, said polysiloxane resin containing methyl and phenyl groups attached to the silicon atoms by carbon-silicon linkages, the number of methyl groups being less than 80 mol per cent of the total number of methyl and phenyl groups, and (2) a solvent for the gelled resin of (1) comprising triethyl amine.

7. The process for reclaiming a hydrocarbon-substituted polysiloxane resin in the gelled, infusible and substantially insoluble state to give a usable form of the said resin, which process comprises dissolving the said resin in a trialkylamine containing from 2 to 3 carbon atoms, inclusive, in the trialkyl group, the said hydrocarbon-substituted polysiloxane resin comprising from 1 to 40 per cent of the total weight of the resin and the trialkyl amine.

8. The process for reclaiming a methyl and phenyl polysiloxane resin which is in the gelled, infusible and substantially insoluble state to give a usable form of the said resin, which process comprises dissolving the resin in triethyl amine, the said methyl and phenyl polysiloxane resin comprising from 1 to 40 per cent of the total weight of the resin and the triethyl amine.

9. The process for reclaiming an allyl, methyl and phenyl polysiloxane resin which is in the gelled, infusible and substantially insoluble state to give a usable form of the said resin, which process comprises dissolving the resin in triethyl amine, the said allyl, methyl and phenyl polysiloxane resin comprising from 1 to 40 per cent of the total weight of the resin and the triethyl amine.

CHARLES D. DOYLE.

REFERENCES CITED

The following references are of record in the file of this patent:

UNITED STATES PATENTS

| Number | Name | Date |
| --- | --- | --- |
| 2,389,807 | McGregor | Nov. 27, 1945 |